May 27, 1969        J. H. JEFFREE        3,446,547
PROJECTION OBJECTIVE FOR MICROFILM ENLARGERS
Filed Sept. 9, 1965
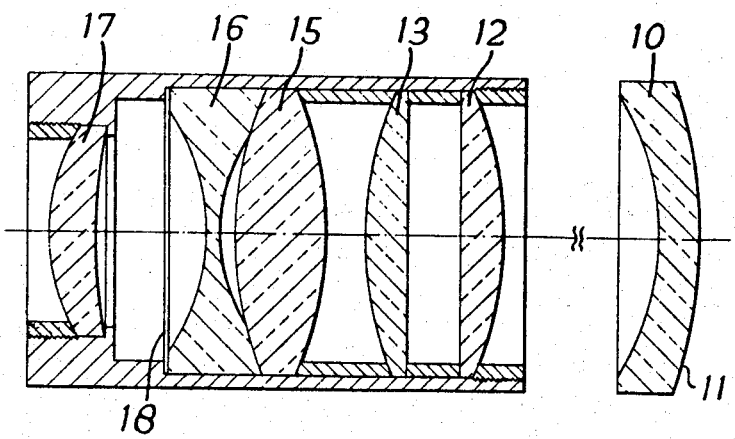

United States Patent Office 3,446,547
Patented May 27, 1969

3,446,547
PROJECTION OBJECTIVE FOR MICROFILM ENLARGERS
John H. Jeffree, London, England, assignor to Caps (Research) Limited, London, England
Filed Sept. 9, 1965, Ser. No. 486,007
Claims priority, application Great Britain, Sept. 25, 1964, 39,294/64
Int. Cl. G02b 9/62
U.S. Cl. 350—215                                                4 Claims

ABSTRACT OF THE DISCLOSURE

An imaging lens system having a focal length of substantially 7.6 centimeters and a flat anastigmatic field of view of an angle greater than 40 degrees includes along the same optical axis a pair of planoconvex lenses spaced from each other with their plane surfaces facing each other followed by a doublet comprising firstly a biconvex lens and secondly a biconcave lens in contact with each other adjoining their peripheral edges but with an air space between them at the center, followed by a concave-convex lens with the concave surface facing the doublet.

---

This invention relates to imaging lens systems suitable for use in microfilm enlargers or for producing an enlarged image of a microfilm frame.

In co-pending U.S. Application Ser. No. 301,849, filed Aug. 13, 1963, now U.S. Patent No. 3,295,407, and which was a continuation-in-part of U.S. Application Ser. No. 59,908, filed Oct. 3, 1960 and now abandoned, there is described optical projection means for projecting enlarged images from microfilm which is particularly suitable for use with ultra-violet light. Included in the projection means is an imaging or magnifying lens system which comprises two positive lenses and, located between the two positive lenses, a cemented doublet of nearly zero power to correct chromatic aberration and aspheric plate of nearly zero power to correct spherical aberration, the four components being arranged along a common axis and mounted to move as a single unit for focussing. Also included is a microfilm locating means comprising a negative meniscus lens the convex surface of which serves as a film register surface and the lens itself which is located between the register surface and the imaging lens system serves to reduce the Petzval field curvature of the system to an amount equal to the curvature of the register surface.

It is an object of the present invention to provide an improved imaging lens system for use in optical projection means such as described in co-pending U.S. application Ser. No. 301,849, and which will give better definition, particularly at the marginal edges of the image.

The imaging lens system of the invention comprises in the order given and arranged along the same optical axis between the microfilm locating means and the image plane:

(a) A pair of planoconvex lenses spaced from each other with their plane surfaces facing each other, followed by (b) A doublet comprising firstly a biconvex lens and secondly a biconcave lens in contact with each other adjoining their peripheral edges but with an air space between them at the centre, followed by (c) A concave-convex or meniscus lens with the concave surface facing the doublet, the lenses being so designed and arranged as to have an anastigmatic field of view of an angle greater than 40° with satisfactory maintenance of correction of spherical aberration over this field. The focal length of the system is in the region of 7.6 cms.

This system may operate with a microfilm locating means formed by the convex surface of a negative meniscus lens as described in co-pending U.S. application Ser. No. 301,849.

Brief description of the drawing

The drawing is a longitudinal cross-sectional view through a lens system according to the invention.

The lens system of the invention is illustrated in the accompanying drawing with the inclusion of the negative meniscus lens which provides the film register surface.

In the drawing, 10 is the negative meniscus lens, the convex surface 11 of which forms the film register surface. 12 and 13 are the pair of planoconvex lenses, 15 and 16 form the doublet, 15 being biconvex and 16 biconcave. 17 is the concave-convex lens.

The parameters of these lenses are set forth in the following table:

| Lens | Radii, mm. | Thickness at center, mm. | Diameter, mm. | Material | Abbe Value (V) | Refractive Index (N) |
|---|---|---|---|---|---|---|
| 10 | +200 and −48.4 | 3 | 57.15 | Zinc crown glass | 61.2 | 1.50759 |
| 12 | +119.1 and ∞ | 5 | 49.6 | Hard crown glass | 60.4 | 1.51899 |
| 13 | ∞ and +88 | 5 | 49.6 | ----do---- | 60.4 | 1.51899 |
| 15 | +56.15 and +69.7 | 14 | 49.6 | ----do---- | 60.4 | 1.51899 |
| 16 | −56.15 and −56.15 | 2.5 | 49.6 | Dense flint glass | 36.1 | 1.62049 |
| 17 | −790 and +53.06 | 10 | 42 | Telescope flint glass | 51.2 | 1.53033 |

The axial distances between the facing surfaces of (a) lenses 12 and 13 is 8.5 mm.
(b) lenses 13 and 15 is 3.9 mm.
(c) lenses 15 and 16 is 0.4 mm.
(d) lenses 16 and 17 is 14.4 mm.

The lenses 12, 13, 15, 16 and 17 are carried in a common mounting and are arranged to move as a single unit for focussing. A stop 18 of 27 mm. diameter is located between lenses 16 and 17 and adjacent to lens 16.

The axial distance of the lens 12 from the lens 10 may be from 49 mm. to 65 mm.

I claim:
1. An imaging lens system having a focal length of substantially 7.6 cms. and a flat anastigmatic field of view of an angle greater than 40 degrees with satisfactory maintenance of correction of spherical aberration over this field, said system comprising in the order given and arranged along the same optical axis, first and second planoconvex lenses 12 and 13 spaced from each other with their plane surfaces facing each other, followed by a doublet comprising firstly a biconvex lens 15 and secondly a biconcave lens 16 in contact with each other adjoining their peripheral edges but with an air space between them at the center, followed by a concave-convex lens 17 with the concave surface facing said doublet, the individual lenses having substantially the parameters as set forth in the following table:

| Lens | Radii, mm. | Thickness at center, mm. | Diameter, mm. | Material | Abbe Value (V) | Refractive Index (N) |
|---|---|---|---|---|---|---|
| 12 | +119.1 and ∞ | 5 | 49.6 | Hard crown glass | 60.4 | 1.51899 |
| 13 | ∞ and +88 | 5 | 49.6 | ...do... | 60.4 | 1.51899 |
| 15 | +56.15 and +69.7 | 14 | 49.6 | ...do... | 60.4 | 1.51899 |
| 16 | −56.15 and −56.15 | 2.5 | 49.6 | Dense flint glass | 36.1 | 1.62049 |
| 17 | −790 and +53.06 | 10 | 42 | Telescope flint glass | 51.2 | 1.53033 | the lenses numbered 12, 13, 15, 16 and 17 in said table corresponding to similarly numbered lenses in the body of the claim preceding the table, the radii for each lens as set forth in said table comprising the radius of curvature of the front face and the radius of curvature of the rear face respectively, the axial distance between the facing surfaces of lenses 12 and 13 being 8.5 mm., the axial distance between the facing surfaces of lenses 13 and 15 being 3.9 mm., the axial distance between the facing surfaces of lenses 15 and 16 being 0.4 mm., the axial distance between the facing surfaces of lenses 16 and 17 being 14.4 mm., and in which a stop of substantially 27 mm. diameter is located adjacent the outer surfaces of the biconcave lens of the doublet.

2. An imaging lens system as claimed in claim 1, in which all the elements therof are carried in a common mounting and are arranged to move as a single unit for focussing.

3. An imaging lens system as defined in claim 1 including a negative meniscus lens arranged along the same optical axis as said lenses, said negative meniscus lens having its concave surface spaced from and facing the convex surface of said first planoconvex lens to serve as a microfilm register surface, said negative meniscus lens being such as to reduce the Petzval field curvature of the system to an amount equal to the curvature of the register surface.

4. An imaging lens system as defined in claim 3 in which the negative meniscus lens has radii of curvature of +200 mm. and −48.4 mm. on the front and rear faces thereof respectively, has a thickness at the center thereof of 3 mm., has a diameter of 57.15 mm., is formed of zinc crown glass, has a refractive index of 1.50759 and has an Abbe value of 61.2.

References Cited
UNITED STATES PATENTS 2,586,866  2/1952  Schade _____ 350—215

DAVID SCHONBERG, *Primary Examiner.*

RONALD J. STERN, *Assistant Examiner.*

U.S. Cl. X.R.

350—216